(12) United States Patent
Nakajima et al.

(10) Patent No.: US 7,725,002 B2
(45) Date of Patent: May 25, 2010

(54) VIDEO CONTENT RECORDING APPARATUS AND VIDEO CONTENT TRANSFER METHOD

(75) Inventors: Atsushi Nakajima, Ome (JP); Kunio Honsawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 7 days.

(21) Appl. No.: 12/264,021

(22) Filed: Nov. 3, 2008

(65) Prior Publication Data

US 2009/0169169 A1    Jul. 2, 2009

(30) Foreign Application Priority Data

Dec. 27, 2007    (JP) .............................. 2007-338307

(51) Int. Cl.
*H04N 7/00* (2006.01)
*H04N 5/91* (2006.01)

(52) U.S. Cl. .......................................... 386/46; 386/94

(58) Field of Classification Search .................... 386/46, 386/94, 95, 124, 125, 45, 92

See application file for complete search history.

(56) References Cited

U.S. PATENT DOCUMENTS

2007/0186271 A1*    8/2007    Ryu et al. .................... 725/135
2008/0175567 A1*    7/2008    Watanabe et al. ........... 386/124
2008/0310819 A1*    12/2008   Akiyama et al. .............. 386/94

FOREIGN PATENT DOCUMENTS

| JP | 2002-367281 | 12/2002 |
| JP | 2006-185473 | 7/2006 |
| JP | 2006-202186 | 8/2006 |

* cited by examiner

*Primary Examiner*—Robert Chevalier
(74) *Attorney, Agent, or Firm*—Blakely, Sokoloff, Taylor & Zafman LLP

(57) ABSTRACT

According to one embodiment, a content recording apparatus includes a management module configured to manage information on content that is transferred from a source apparatus and stored in a storage device, and the content the source apparatus has, a recording module configured to record the content transferred from the source apparatus to the storage device in the inactive state and to retain the content in the source apparatus, and a control module configured to issue a command to the source apparatus based on the information on the content managed by the management module if the user determines that the content is used, the command being intended to deactivate content the source apparatus has, and configured to activate the content stored in the storage device in response to deactivation of the content the source apparatus has.

10 Claims, 13 Drawing Sheets

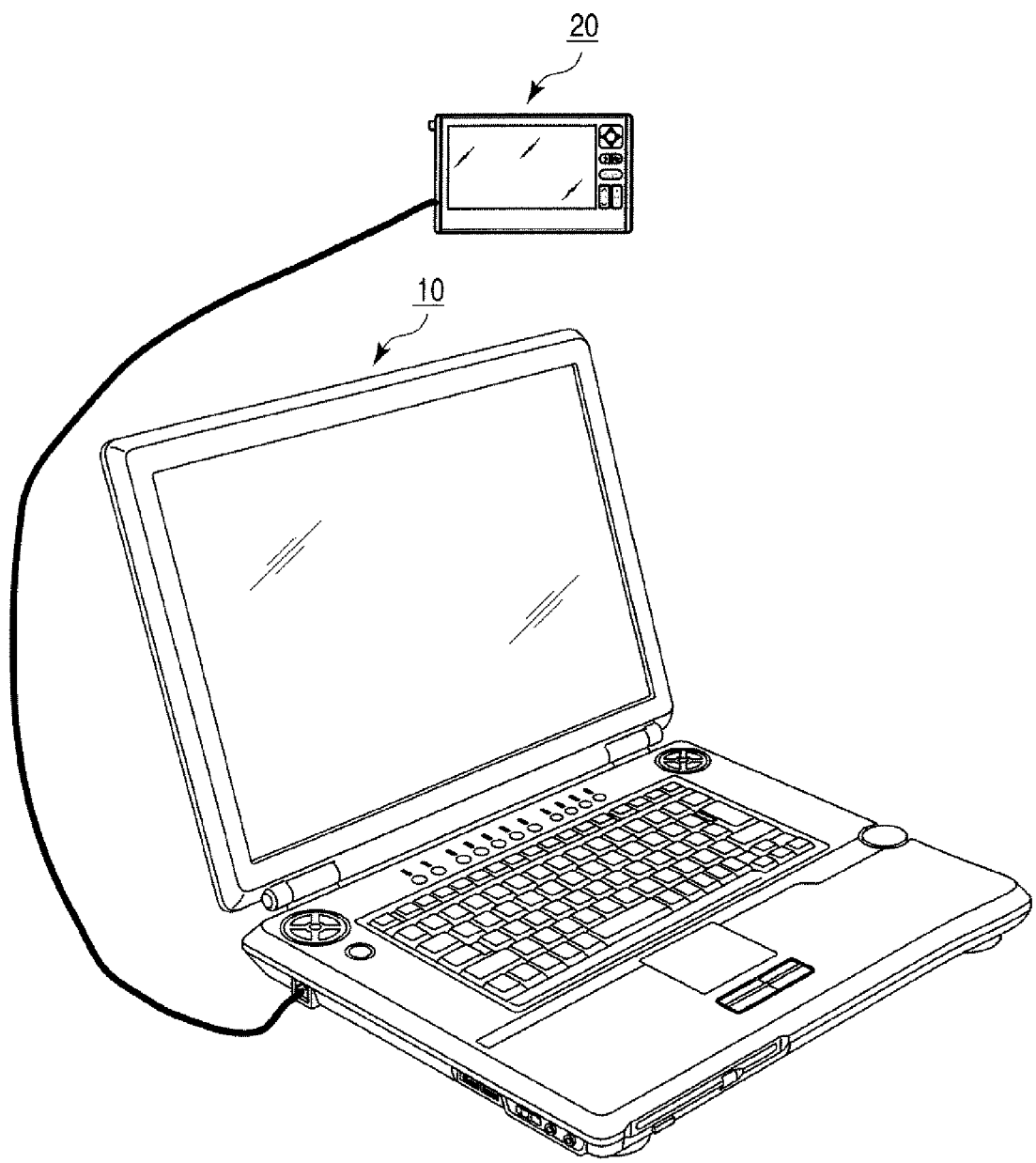
F I G. 1

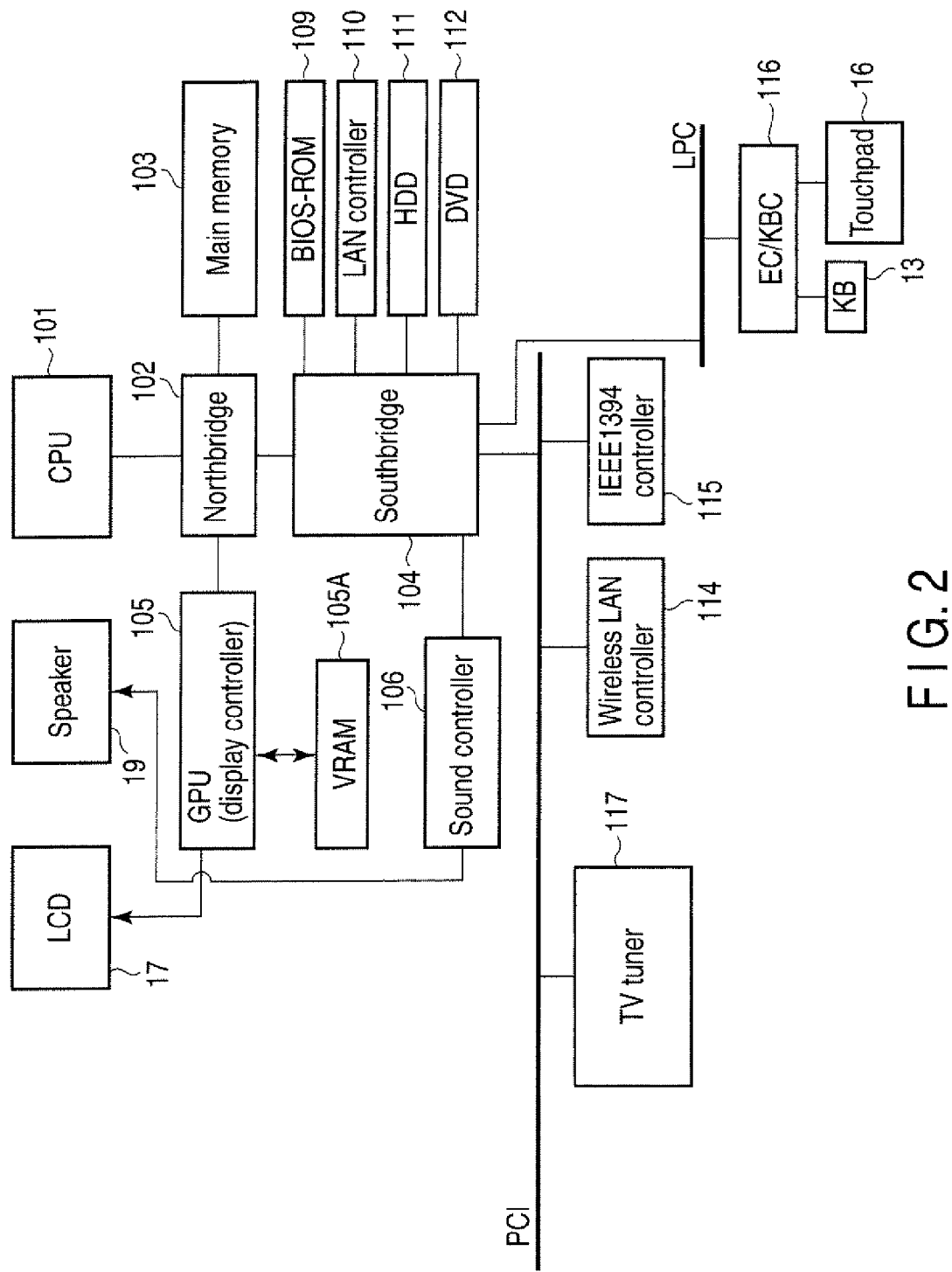
F I G. 2

| Partner apparatus identification information | Master apparatus file information | Partner apparatus file information | Content information |
|---|---|---|---|
| MAC address 00:11:22:33:44:55 | /dir1/filename1  Active | /dir2/filename2  Inactive | Program A, drama, in 2 hours |
| IP address 192.168.0.100 | File ID:101  Active | File ID:102  Inactive | Program B, comedy show, in 1 hour |

F I G. 5

Destination: selection preparation processing start request module

Destination: move candidate determination module

VIDEO CONTENT RECORDING APPARATUS AND VIDEO CONTENT TRANSFER METHOD

CROSS-REFERENCE TO RELATED APPLICATIONS

This application is based upon and claims the benefit of priority from Japanese Patent Application No. 2007-338307, filed Dec. 27, 2007, the entire contents of which are incorporated herein by reference.

BACKGROUND

1. Field

One embodiment of the invention relates to a video content recording apparatus which records copyright-protected video content transferred from a source apparatus, and a video content transfer method.

2. Description of the Related Art

Content currently available via digital terrestrial and digital DBS broadcasting is copyright-protected and may not be duplicated. In order to use the content on an apparatus different from the one on which it was recorded, the content must be moved in advance.

When moving copyright-protected content between apparatuses through a network or the like, a content moving method defined by various standards is typically used so that unauthorized copies cannot be made.

Initially, the destination apparatus issues a transfer request for the content to the source apparatus. In response, the source apparatus transfers the content to the destination apparatus. Here, the destination apparatus records the content but not in a usable state (referred to as the inactive state, the usable state in the source apparatus, on the other hand, being referred to as the active state). The processing so far will be referred to as transfer processing.

After the entire content has been transferred, the destination apparatus issues a deactivation request for the content to the source apparatus. In response, the source apparatus deletes the content and reports the deletion to the destination apparatus. The destination apparatus makes the content usable. The processing so far from the end of the transfer processing will be referred to as move confirmation processing.

This method eliminates the period where usable content coexists in both apparatuses, and can thus move the content while preventing the creation of unauthorized copies. The content moving method described above will be referred to as a transaction-based move.

Since it takes time to move content, it is inconvenient, entailing a long wait, to move content from scratch after a need arises to use the content.

Suppose, for example, that one wishes to move content from a DVD recorder or the like to a cellular phone when going out and to view the content with the cellular phone away from home. He/she then needs to wait for the transfer time if the content moving operation is performed from scratch before going out. For example, when an hour's content recorded at 25 Mbps is transmitted through a 100Base network with an effective rate of 50 Mbps, the transfer time to wait up to the end of the transfer is as much as approximately 30 minutes.

With copiable content, it is possible to copy all the content to the destination apparatus anyway instead of moving. The content then can be selected anytime to keep the needed for use and delete the unneeded. The content deleted from the destination apparatus will not be completely lost since the same content is still in the source apparatus.

Content that can only be moved, on the other hand, will be lost permanently from both the apparatuses if it is moved in advance and then deleted during selection, being determined not to be used this time. To avoid this, if the content is kept undeleted in the destination apparatus, the storage capacity will be wasted. Moving the content back to the original apparatus for this reason eventually takes time.

Jpn. Pat. Appln. Laid-Open Publication No. 2006-185473 discloses a technique for reducing the waiting time of move processing in a digital content recording and reproducing apparatus, by moving content under reproduction while maintaining a move condition even during reproduction.

The technique disclosed in Jpn. Pat. Appln. Laid-Open Publication No. 2006-185473 is not a fundamental solution, however, since the time from the occurrence of a need to the completion of a move is unchanged.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary perspective view showing a notebook personal computer as a source apparatus and a multimedia player as a destination apparatus, between which the transfer of video content according to a first embodiment is performed;

FIG. 2 is an exemplary block diagram showing the system configuration of the notebook personal computer shown in FIG. 1;

FIG. 5 is an exemplary chart showing an example of activation information stored in the activation information table shown in FIG. 4;

DETAILED DESCRIPTION

Figure 3:
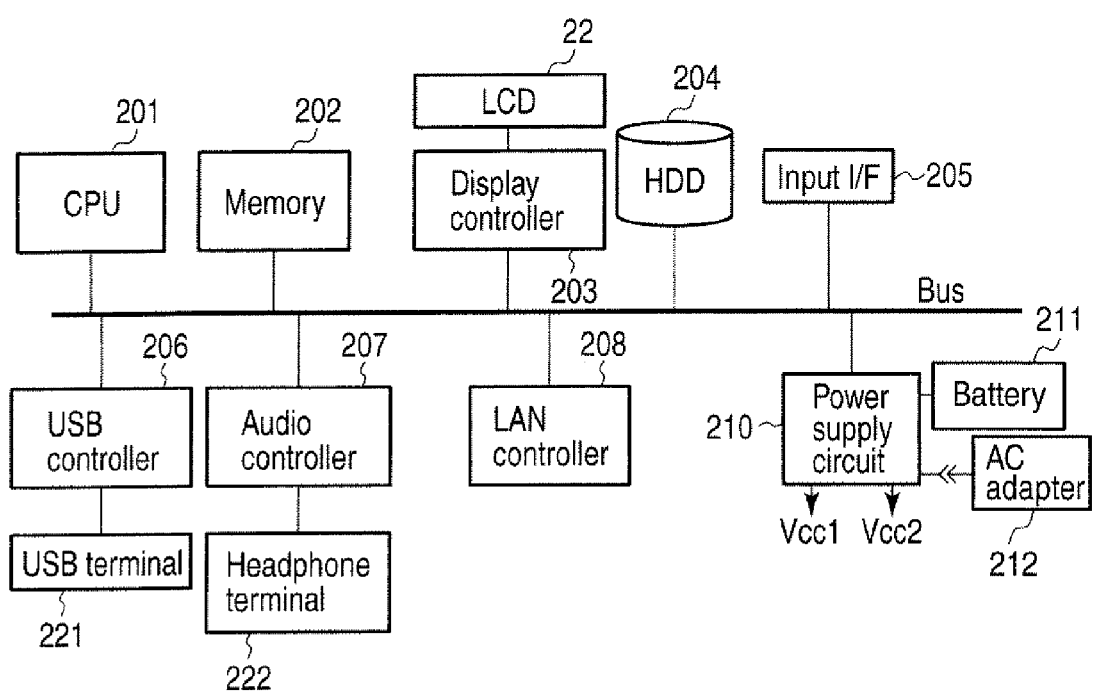
FIG. 3 is an exemplary block diagram showing the system configuration of the multimedia player shown in FIG. 1.

Various embodiments according to the invention will be described hereinafter with reference to the accompanying drawings. In general, according to one embodiment of the invention, a video content recording apparatus comprises a storage device configured to store copyright-protected video content in an active or inactive state, a management module configured to manage information on video content that is transferred from a source apparatus and stored in the storage device, and the video content the source apparatus has, a recording module configured to record the video content transferred from the source apparatus to the storage device in the inactive state and to retain the video content in the source apparatus, an input module configured for a user's determination whether or not to use the video content to be input to after the transfer of the video content is completed, and a control module configured to issue a command to the source apparatus based on the information on the video content managed by the management module if the user inputs a determination for use, the command being intended to deactivate video content the source apparatus has, and configured to activate the video content stored in the storage device in response to deactivation of the video content the source apparatus has.

FIG. 1 is a perspective view showing a notebook personal computer as a source apparatus and a multimedia player as a video content recording apparatus and destination apparatus, between which the transfer of video content according to the first embodiment of the present invention is performed.

The personal computer has a digital TV tuner inside, and can record video content received by the digital TV tuner on a built-in hard disk drive (HDD). The personal computer and the multimedia player can exchange data through a LAN cable. Then, the video content recorded on the HDD of the personal computer can be transferred to the multimedia player.

FIG. 2 is a block diagram showing the system configuration of the personal computer according to the first embodiment of the present invention.

Referring to FIG. 2, the system configuration of the personal computer 10 will now be described.

As shown in FIG. 2, the personal computer 10 comprises a central processing unit (CPU) 101, a Northbridge 102, a main memory 103, a Southbridge 104, a graphics processing unit (GPU) 105, a video memory (VRAM) 105A, a sound controller 106, a BIOS-ROM 109, a LAN controller 110, a hard disk drive (HDD) 111, a high-definition digital versatile disk (HD DVD)/DVD drive (ODD) 112, a wireless LAN controller 114, an IEEE 1394 controller 115, an embedded controller/keyboard controller IC (EC/KBC) 116, a digital TV tuner 117, etc.

The CPU 101 is a processor for controlling the operation of the personal computer 10. The CPU 101 executes an operation system and various types of application programs which are loaded into the main memory 103 from the hard disk drive (HDD) 111. The CPU 101 also executes a Basic Input/Output System (BIOS) which is stored in the BIOS-ROM 109. The BIOS is a program intended for hardware control.

The Northbridge 102 is a bridge device for establishing communication between the local bus of the CPU 101 and the Southbridge 104. The Northbridge 102 has a built-in memory controller which exercises access control on the main memory 103. The Northbridge 102 also has the function of performing communication with the GPU 105 through a PCI EXPRESS serial bus or the like.

The GPU 105 is a display controller for controlling an LCD 17 which is used as a display monitor of the personal computer 10. A display signal generated by the GPU 105 is transmitted to the LCD 17. The display signal may also be transmitted to an external TV and an external HDMI monitor through respective interfaces which are formed on a computer body.

The Southbridge 104 controls each device on a Low Pin Count (LPC) bus and each device on a Peripheral Component Interconnect (PCI) bus. The Southbridge 104 has a built-in Integrated Drive Electronics (IDE) controller for controlling the HDD 111 and the ODD 112. The Southbridge 104 also has the function of performing communication with the sound controller 106.

The sound controller 106 is an audio device which outputs audio data to be reproduced to a speaker 19.

The LAN controller 110 is a controller for controlling network communications based on 100BASE-T standards. The wireless LAN controller 114 is a wireless communication device for performing wireless communication, for example, based on IEEE 802.11 standards. The IEEE 1394 controller 115 performs communication with external devices through an IEEE 1394 serial bus. The embedded controller/keyboard controller IC (EC/KBC) 116 is a single-chip microcomputer in which an embedded controller intended for power management and a keyboard controller for controlling a keyboard (KB) 13 and a touchpad 16 are integrated. This embedded controller/keyboard controller IC (EC/KBC) 116 has the function of turning the power of the personal computer 10 on/off according to user operations on a power button.

The digital TV tuner 117 is a receiver for receiving broadcast program data which is broadcast by television (TV) broadcast signals, and is connected to an antennal terminal. This digital TV tuner 117 is implemented, for example, as a digital TV tuner which can receive digital broadcast program data such as a digital terrestrial TV broadcasts. The digital TV tuner 117 also has the function of capturing video data that is input from an external device.

The computer 10 has a application program for executing recording processing by which the broadcast program data received by the digital TV tuner 117 or the video data input from an external device is recorded on the HDD 111. This program also executes programmed recording processing for receiving broadcast program data specified by recording program information (channel number, date and time), which is set by the user in advance, and recording the broadcast program data on the HDD 111.

Now, the system configuration of the multimedia player will be described with reference to FIG. 3.

As shown in FIG. 3, the multimedia player 20 comprises a CPU 201, a memory 202, a display controller 203, a hard disk drive (HDD) 204, an input interface unit 205, a USB controller 206, an audio controller 207, a LAN controller 208, a power supply circuit 210, a battery 211, etc.

The CPU 201 is a processor for controlling the operation of the multimedia player 20. The CPU 201 executes various types of application programs (such as an operating system and application programs) loaded into the memory 202. An application program is a program for executing reproduction of audio data and video data, reproduction of one-segment broadcasts, and so on.

The display controller 203 controls an LCD 22, and displays various operation menus, images corresponding to video data reproduced by the application program, and the like on the display screen of the LCD 22. The HDD 204 functions as a storage device for storing various types of data including audio data and video data. The input interface unit 205 is a controller for controlling various groups of buttons 205A formed on the multimedia player 20. The USB controller 206 is connected to a USB terminal 221 which is formed in the body of the multimedia player 20. The USB controller 206 performs communication with various types of other devices connected to the USB terminal 221. The audio controller 207 is an audio device which generates an audio signal corresponding to audio data reproduced by the application program, and outputs the audio signal to a headphone terminal 222. The LAN controller 208 is a controller for controlling network communications based on 100BASE-T standards in order to perform communication with the personal computer 10.

Figure 4:
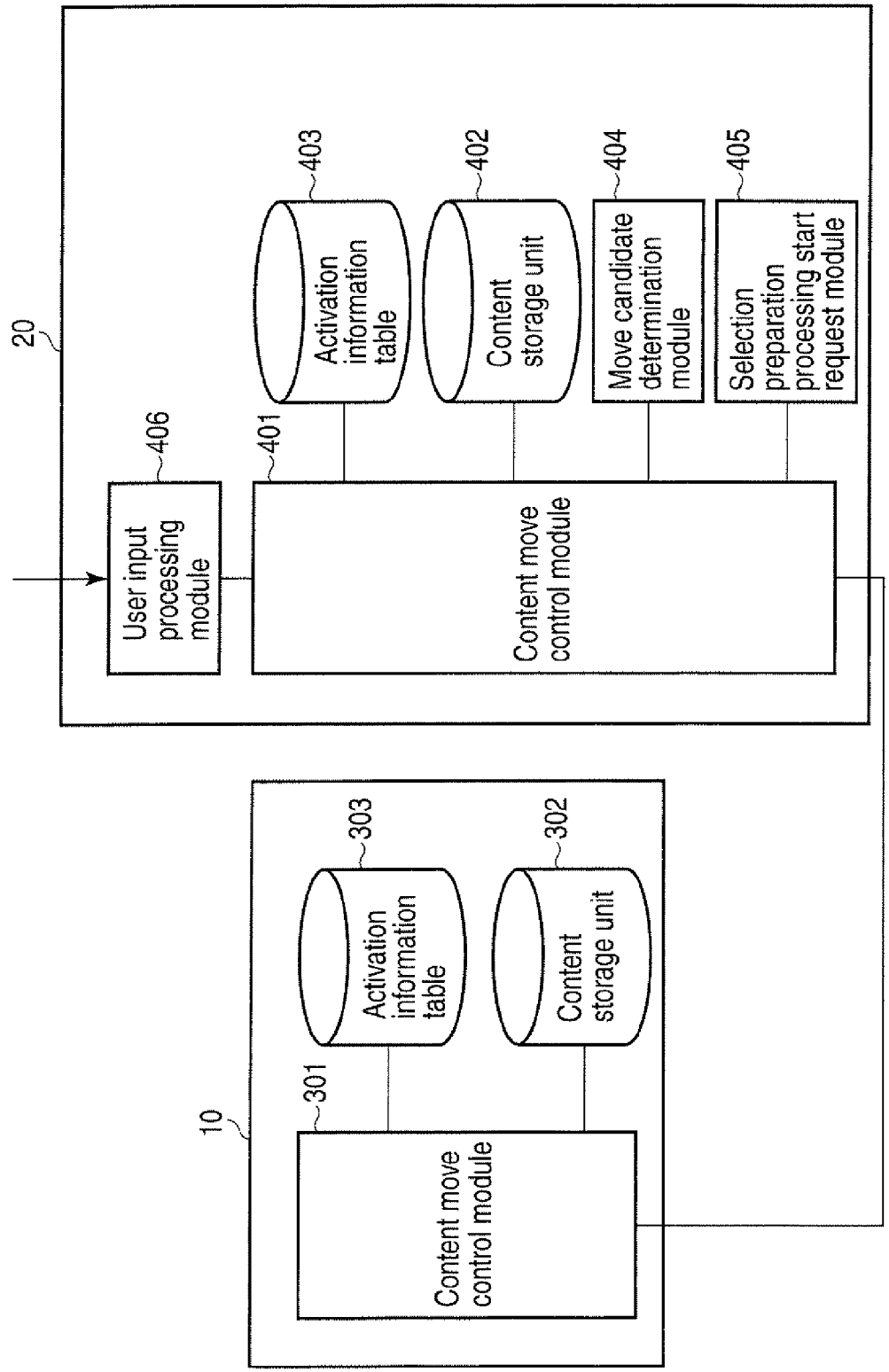
FIG. 4 is an exemplary block diagram showing the system configuration for transferring video content stored in the HDD of the personal computer to the HDD of the multimedia player.

Next, referring to FIG. 4, description will be given of a system configuration for transferring video content stored in the HDD of the personal computer 10 to the HDD of the multimedia player 20.

In this method, a transaction-based move is performed halfway in advance on copyright-protected content that seems to be going to be moved. The content is thereby retained in an activation waiting state, being inactive in one of the apparatuses and active in the other. Before using the content, the content is activated or the inactive content is discarded depending on need. This makes it possible to move the content to the destination apparatus in a shorter time than to move all from scratch.

The personal computer 10 has a content move control module 301, a content storage unit 302, an activation information table 303, etc.

The multimedia player 20 has a content move control module 401, a content storage unit 402, an activation information table 403, a move candidate determination module 404, a selection preparation processing start request module 405, a user input processing module 406, etc.

The content move control modules 301 and 401 perform processing pertaining to the move of video content. The content move control modules 301 and 401 also exercise control on components, execute processing corresponding to requests from the components, and exchange content and control information with other apparatuses over a network.

The content storage units 302 and 402 are hard disk drives or other storage devices for storing content.

The activation information tables 303 and 403 are tables for recording transfer information. The transfer information refers to information that is necessary for transferring video content by a transaction-based move. The transfer information is created by both the apparatuses 10 and 20 for each individual content item to move, and retained from the end of transfer to the end of activation. FIG. 5 shows an example of the transfer information table. As shown in FIG. 5, the activation information has the following items:

Partner apparatus identification information: information for uniquely identifying a partner apparatus for communication (IP address, MAC address, or other IDs of the partner apparatus (corresponding to the UUID of UPnP (TM));

Own-apparatus file information: information for determining which content is targeted in the own-apparatus (filename, file ID, or the like), and the state of the content (active or inactive);

Partner apparatus file information: information for determining which content is targeted in the partner apparatus (filename, file ID (corresponding to CDS object ID), or the like), and the state of the content (active or inactive); and Content information: information on the content, such as program name, genre, and recording duration.

The HDDs are the recording areas for storing the content. According to instructions from the content move control modules, the HDDs store active or inactive content, and read or delete the stored content.

The move candidate determination module 404 determines move candidates. Based on a move candidate determination condition which is set in advance, the move candidate determination module 404 selects move candidates from all the content information received from the content move control module 401. The move candidate determination module 404 returns the content information thereon to the content move control module 401.

The selection preparation processing start request module 405 instructs to start selection preparation processing. When it comes to a selection preparation start time which is set in advance, the selection preparation processing start request module 405 issues a start request for the selection preparation processing to the content move control module 401.

Next, description will be given of the actual transfer processing. The transfer processing is performed when both the apparatuses have sufficient processing power available. For example, the transfer processing is performed in an idle time such as the following:

1. At a time when typical users are unlikely to access, such as late every night;

2. At a user-specified time;

3. At a time when neither of the apparatuses is programmed for recording or the like; and 4. At a time when operations are unlikely to be made, being predicted from learning about the time slots when the user has made operations in the past.

The multimedia player 20 that is the destination apparatus acquires the content information on all the content from the personal computer 10 that is the source apparatus, in an idle time and selects candidate content under a condition such as the following:

1. Programs specified by the user in advance;

2. Content of a specified genre, such as variety show and documentary;

3. Programs with specified keywords in their program names;

4. Content that fits into a specified time range, such as that recorded the previous day;

5. Content predicted from learning about the user's preferences, based on what has been activated and what not after several repetitions of the foregoing conditions; and 6. Without any particular condition, all content may be listed as a candidate.

Now, referring to FIGS. 6A to 6D, description will be given of the actual processing of transferring content after the determination of which content to transfer.

Figure 6:
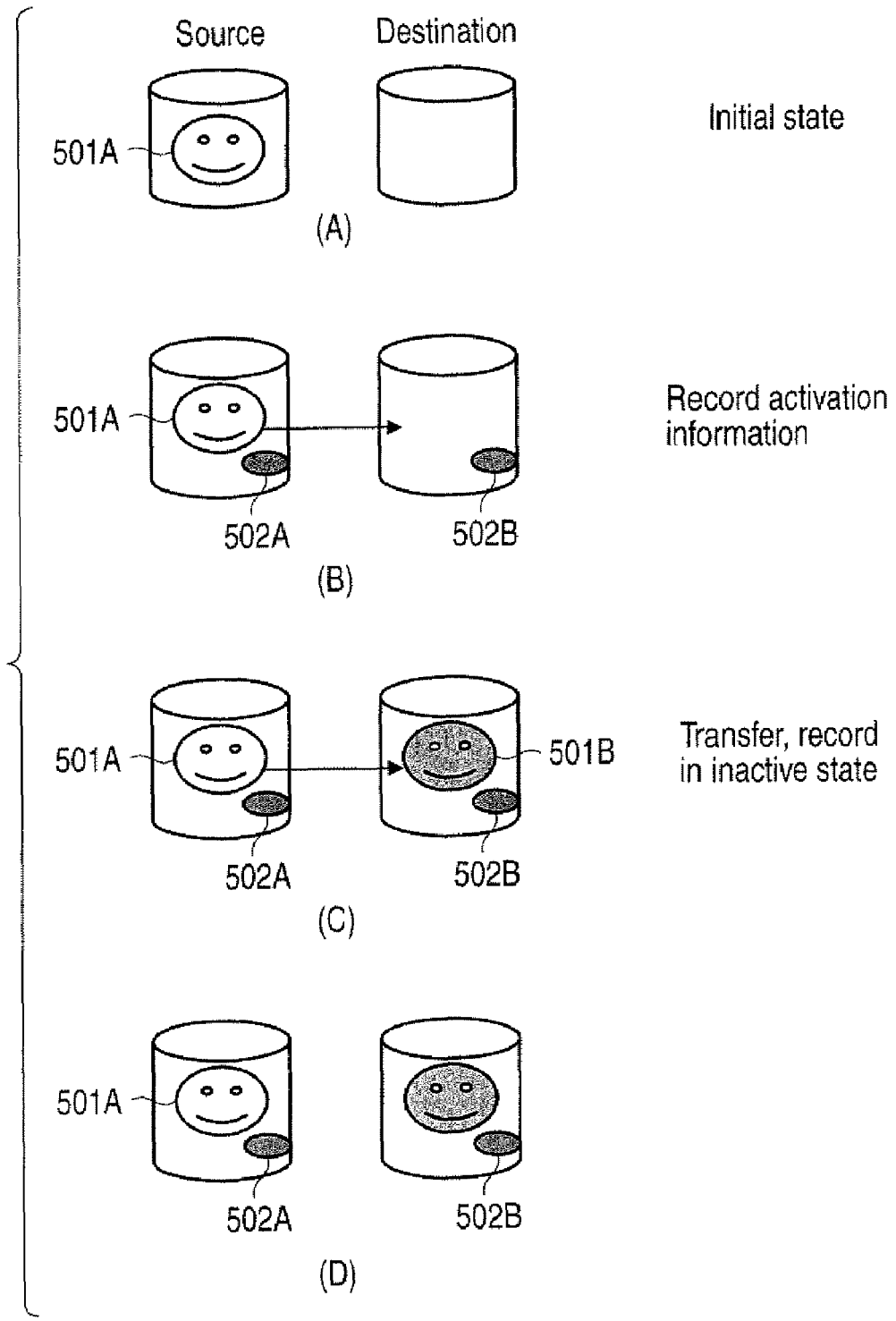
FIG. 6A, FIG. 6B, FIG. 6C, and FIG. 6D are diagrams for explaining the actual processing of transferring content after the determination of which content to transfer.

FIG. 6A shows an initial state for transfer, where the multimedia player 20 serving as the destination apparatus has neither content nor activation information. Prior to the transfer, as shown in FIG. 6B, items of activation information 502A and 502B on content 501 to be transferred are registered in the respective activation information tables of the personal computer 10, or source apparatus, and the multimedia player 20, or destination apparatus. Here, the personal computer 10 activates the file information pertaining to the source apparatus in the activation information 502A. The multimedia player 20 deactivates the file information pertaining to the destination apparatus in the activation information 502B.

After the creation of the activation information, as shown in FIG. 6C, the personal computer 10 starts transferring the video content 501A to the multimedia player 20, and video content 501B is stored in the multimedia player 20. As shown in FIG. 6D, the multimedia player 20 has the content 501B inactive, the personal computer 10 has the content 501A active, and both the apparatuses have the activation information 502A and 502B, thereby getting ready for immediate activation (referred to as selection preparation processing).

The idle time is set by the system in advance. Idle times subsequent to that time are also set automatically.

The condition for selecting candidate content is also set by the system in advance.

When using the content, the user makes operations to determine whether or not each content item that has undergone the selection preparation processing is needed. If needed, the content is activated. If not, the inactive content and the activation information are discarded (referred to as selection processing).

The selection processing will be described with reference to FIGS. 7A to 7I.

Figure 7:
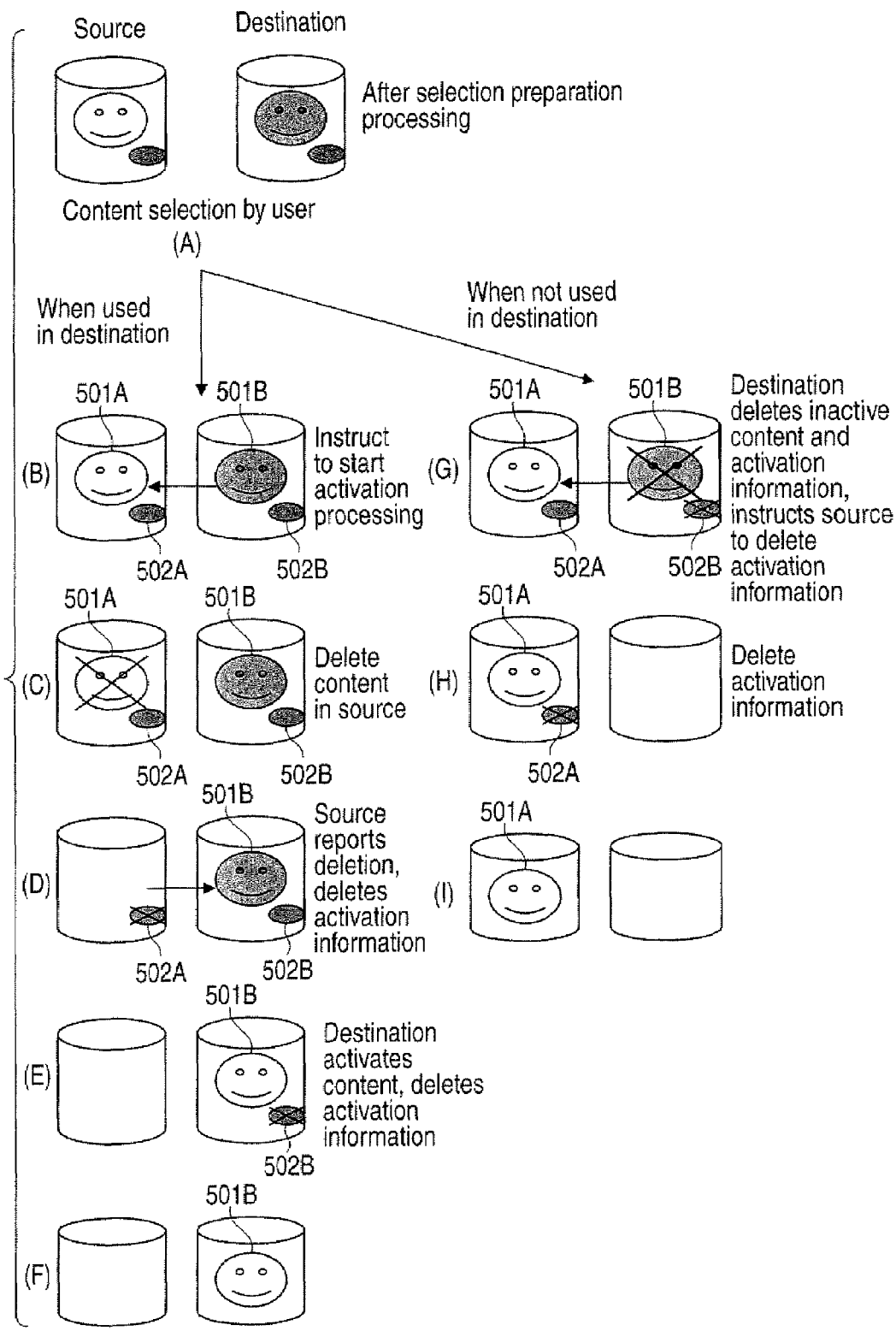
FIG. 7A, FIG. 7B, FIG. 7C, FIG. 7D, FIG. 7E, FIG. 7F, FIG. 7G, FIG. 7H, and FIG. 7I are diagrams showing the process of selection processing.

In the state after the selection preparation processing (FIG. 7A), selection is performed in the multimedia player 20 as to whether the content is needed or not. If the user selects to use the content in the multimedia player 20, the multimedia player 20 instructs the personal computer 10 to start activation processing for using the content on the multimedia player 20 (FIG. 7B). The personal computer 10 deletes the content 501A (FIG. 7C). The personal computer 10 reports the deletion of the content 501A to the multimedia player 20, and then deletes the activation information 502A (FIG. 7D). The multimedia player 20 activates the content 501B, and then deletes the activation information 502B (FIGS. 7E and 7F).

If the user selects not to use the content in the multimedia player 20, the multimedia player 20 deletes the inactive content 501B and the activation information 502B, and instructs the personal computer 10 to delete the activation information 502A (FIG. 7G). The personal computer 10 deletes the activation information 502A (FIGS. 7H and 7I). That is the end of the selection processing.

This method can move needed content alone to the multimedia player 20 in a shorter time than when moving all the content from scratch. Unneeded content will not be lost, either, since it is still in the personal computer 10.

Now, the processing to be performed by the components shown in FIG. 4 will be described with reference to flowcharts.

Figure 8:
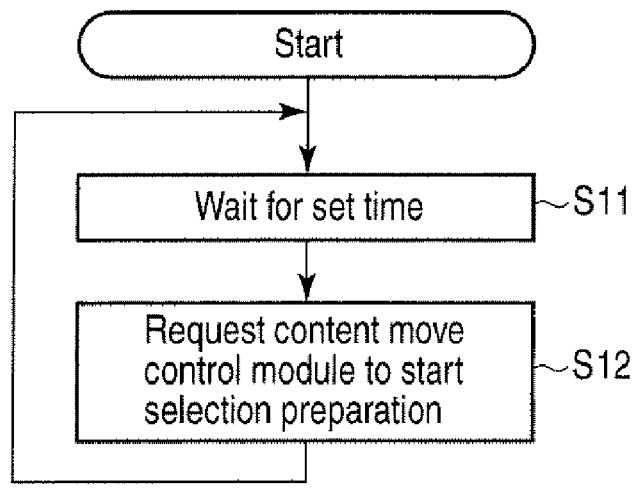
FIG. 8 is an exemplary flowchart showing the procedure of processing to be performed by a selection preparation processing start request module of the multimedia player serving as the destination apparatus.

Initially, referring to FIG. 8, description will be given of the processing to be performed by the selection preparation processing start request module 405 of the multimedia player 20 serving as the destination apparatus. The selection preparation processing start request module 405 of the multimedia player 20 serving as the destination apparatus is started upon system startup, and performs the following processing.

Initially, the selection preparation processing start request module 405 waits for an idle time which is set in advance (block S11). When it comes to the set idle time, the selection preparation processing start request module 405 requests the content move control module 401 of the multimedia player 20 to start selection preparation (block S12). The selection preparation processing start request module 405 of the multimedia player 20 repeats the foregoing processing.

Figure 9:
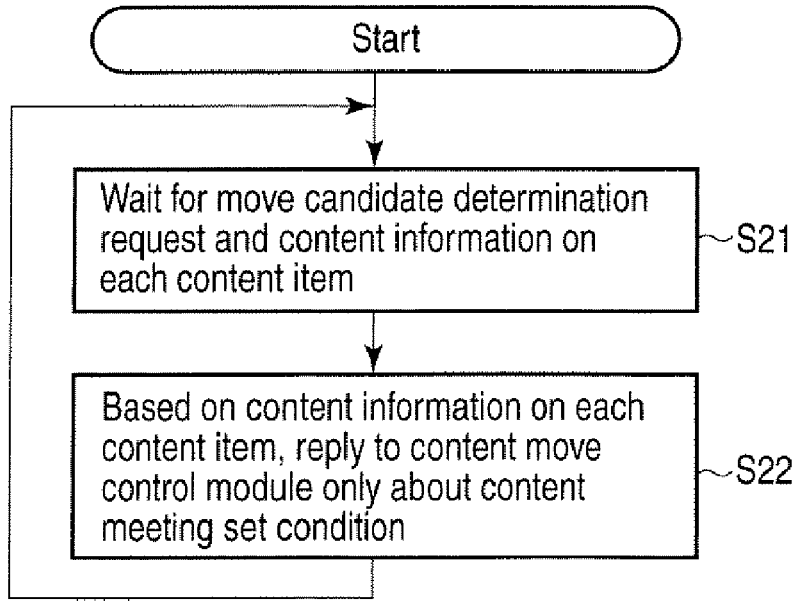
FIG. 9 is an exemplary flowchart showing the procedure of processing to be performed by a move candidate determination module of the multimedia player serving as the destination apparatus.

Next, referring to FIG. 9, description will be given of the processing to be performed by the move candidate determination module 404 of the multimedia player 20. The move candidate determination module 404 of the multimedia player 20 is started upon system startup, and performs the following processing.

Initially, the move candidate determination module 404 waits for a move candidate determination request from the content move control module 401 and the content information on each content item transmitted from the computer 10 (block S21). Receiving the move candidate determination request from the content move control module 401, the move candidate determination module 404 replies to the content move control module 301 of the personal computer 10 serving as the source apparatus, through the content move control module 401 only about content meeting a move candidate determination condition which is set in advance (block S22). The move candidate determination module 404 of the multimedia player 20 repeats the foregoing processing.

Figure 10:
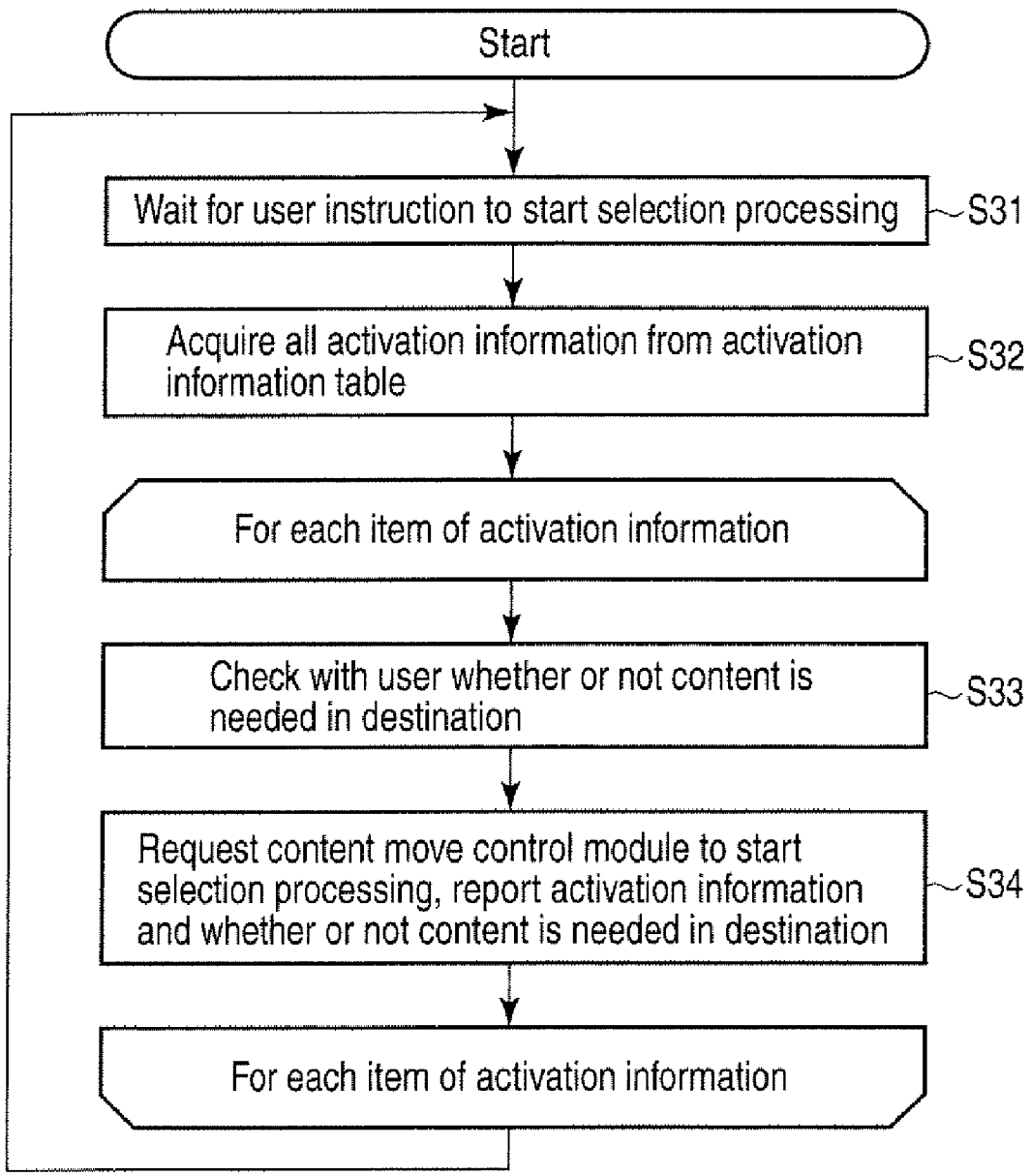
FIG. 10 is an exemplary flowchart showing the procedure of processing to be performed by a user input processing module of the multimedia player serving as the destination apparatus.

Next, referring to FIG. 10, description will be given of the processing to be performed by the user input processing module 406 of the multimedia player 20. The user input processing module 406 is started upon system startup, and performs the following processing.

The user input processing module 406 waits for a selection processing start instruction which is given by a user operation (block S31). Receiving the selection processing start instruction, the user input processing module 406 acquires all the activation information registered in the activation information table (block S32).

The user input processing module 406 then performs the processing of blocks S33 and S34 on each item of activation information. The user input processing module 406 performs the processing of checking with the user whether the content is needed or not (block S33). To check with the user, the LCD 22 displays information including the name of the content and buttons from which the user selects whether the content is needed or not.

The user input processing module 406 requests the content move control module 401 to start the selection processing, and reports the activation information on the checked content and the check result whether or not the content is needed in the destination apparatus (block S34). The user input processing module 406 repeats the foregoing processing.

Figure 11:
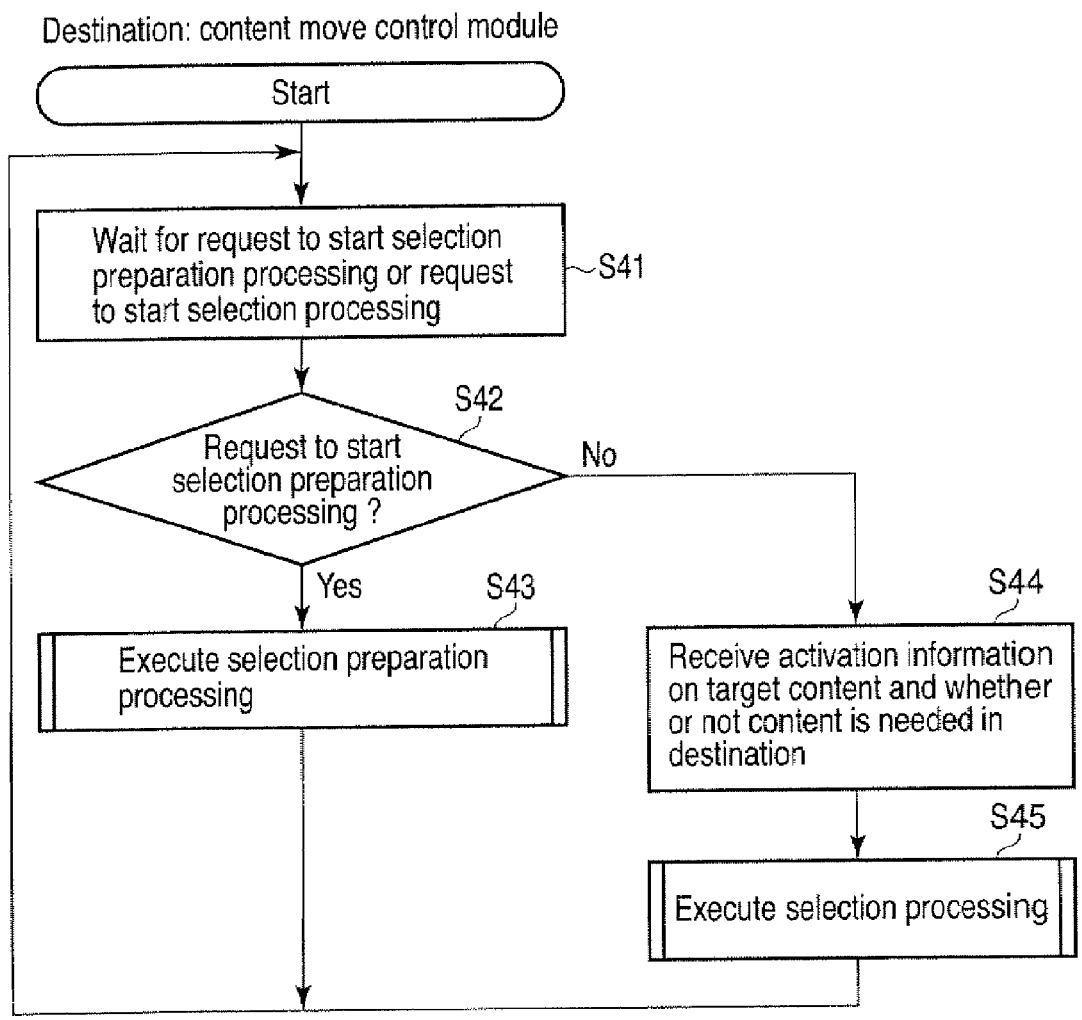
FIG. 11 is an exemplary flowchart showing the procedure of processing to be performed by a content move control module of the multimedia player serving as the destination apparatus.

Next, referring to FIG. 11, description will be given of the processing to be performed by the content move control module 401 of the multimedia player 20. The content move control module 401 of the multimedia player 20 is started upon system startup, and performs the following processing.

The content move control module 401 waits for a request to start the selection preparation processing, transmitted from the selection preparation processing start request module 405, and a request to start the selection processing, transmitted from the move candidate determination module 404 (block S41). Receiving a request, the content move control module 401 determines whether or not the request received is to start the selection preparation processing (block S42). If it is determined to be the request to start the selection preparation processing (YES in block S42), the content move control module 401 executes the selection preparation processing (block S43).

If it is determined not to be the request to start the selection preparation processing (NO in block S42), i.e., if the request is to start the selection processing, the content move control module 401 receives the activation information on the target content and the check result of whether or not the content is needed in the destination (block S44). Receiving these, the content move control module 401 executes the selection processing (block S45).

Figure 12:
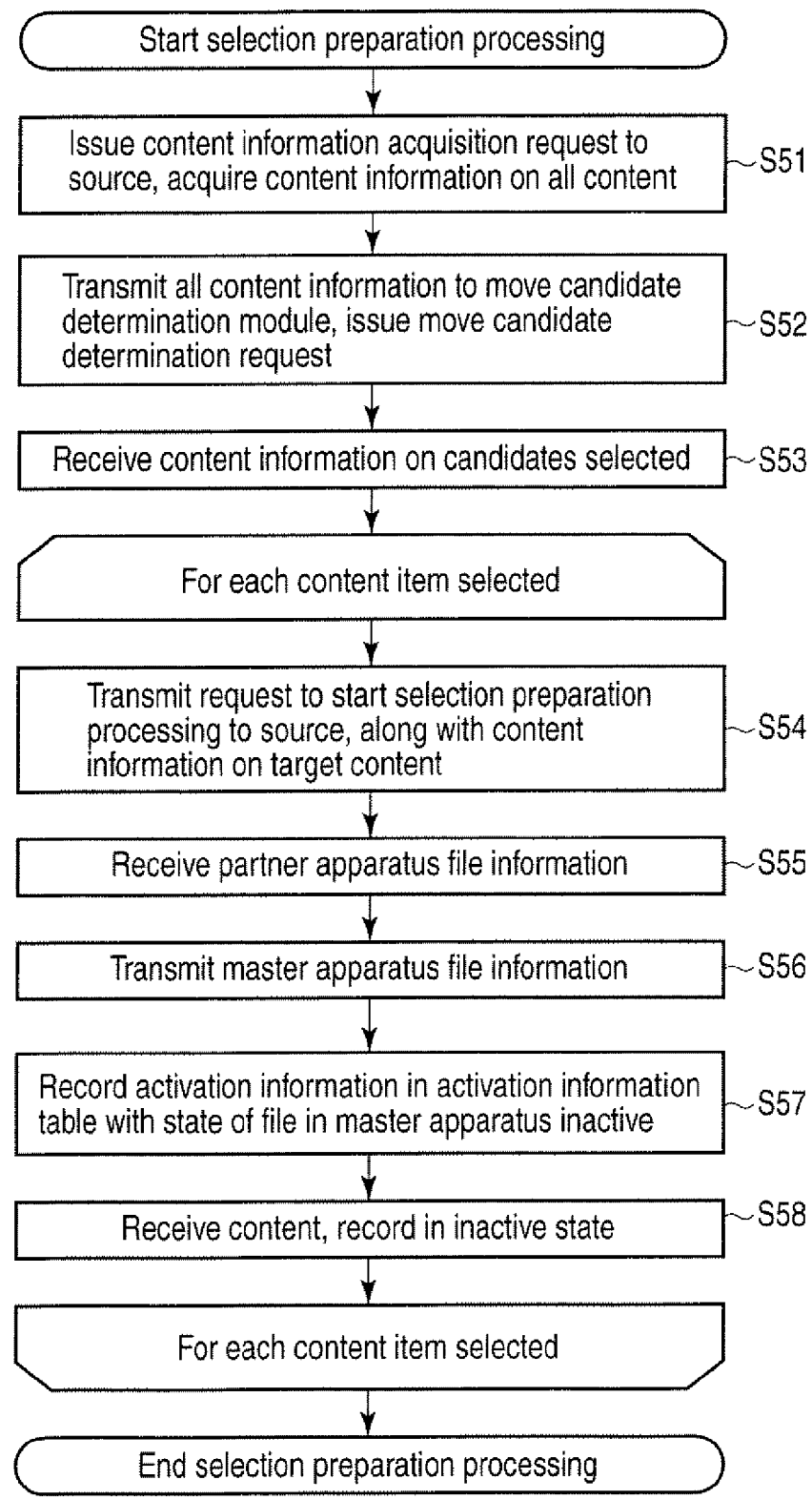
FIG. 12 is an exemplary flowchart for showing the procedure of the selection preparation processing in block S43 of FIG. 11.

Next, the selection preparation processing in block S43 will be described with reference to FIG. 12.

Initially, the content move control module 401 issues a content information acquisition request to the computer 10 serving as source apparatus, and acquires the content information on all the content the computer 10 has (block S51). The content information on all the content the computer 10 has can be acquired, for example, based on UPnP (TM). The destination apparatus can acquire the content information by using Content Directory Service (CDS).

Having acquired the content information from the computer 10, the content move control module 401 transmits the content information acquired to the move candidate determination module 404, and issues a move candidate determination request (block S52).

Subsequently, the content move control module 401 receives the content information on selected candidates from the move candidate determination module 404 (block S53).

The content move control module 401 then performs the processing of blocks S54 to S57 on each content item selected.

The content move control module 401 transmits a request to start the selection preparation processing to the computer 10, along with the content information on the target content (block S54).

The content move control module 401 receives the partner apparatus file information from the computer 10 (block S55). The content move control module 401 creates own-apparatus file information from the information on inactive content that is going to be recorded, and transmits it to the source (block S56). The content move control module 401 records the information acquired so far in the activation information table 403 as activation information, with the state of the file in the own-apparatus inactive (block S57). Having registered the activation information in the activation information table, the content move control module 401 receives the content from the computer 10 and records the content in an inactive state (block S58). That is the end of the selection preparation processing.

Figure 13:
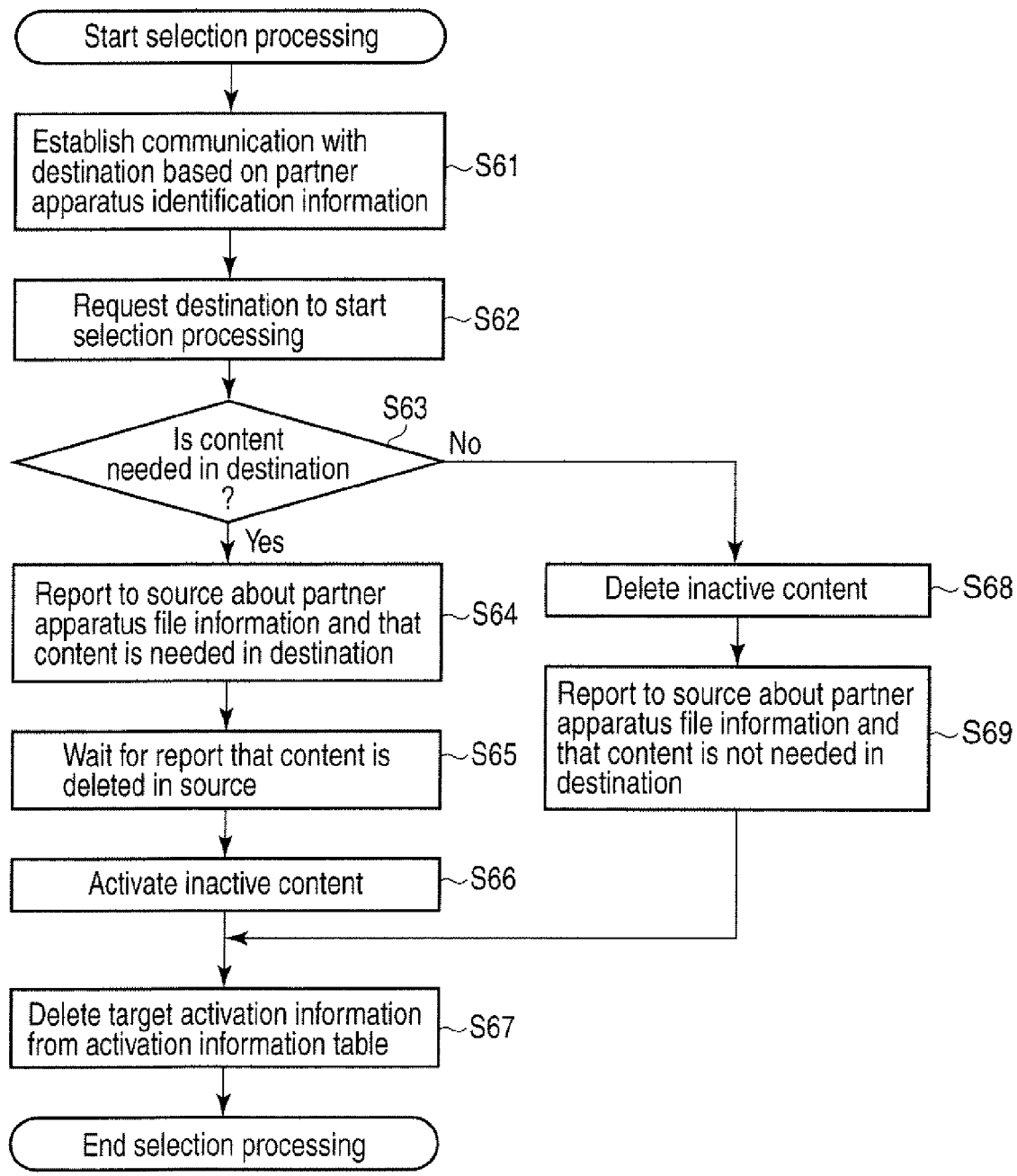
FIG. 13 is an exemplary flowchart for showing the procedure of the selection processing in block S45 of FIG. 11.

Next, the selection processing of the content move control module 401 in block S45 will be described with reference to FIG. 13.

The content move control module 401 establishes communication with the destination based on the partner apparatus identification information in the activation information (block S61). After the establishment of the communication, the content move control module 401 requests the destination to start the selection processing (block S62).

The content move control module 401 determines whether or not the content is needed in the multimedia player 20 serving as the destination apparatus (block S63). If the content is determined to be needed (YES in block S63), the content move control module 401 reports to the computer 10 serving as the source apparatus about the partner apparatus file information and that the content is needed in the destination (block S64). The content move control module 401 waits for a report from the source that the active content is deleted (block S65). Receiving the delete report, the content move control module 401 activates the inactive content (block S66).

If it is determined in block S63 that the content is not needed (NO in block S63), the content move control module 401 deletes the inactive content the own-apparatus has (block S68). The content move control module 401 reports to the computer 10 about the partner apparatus file information and that the content is not needed in the own-apparatus (block S69).

After the processing of block S66 or S69, the content move control module 401 deletes the target activation information from the activation information table (block S67). That is the end of the selection processing.

Figure 14:
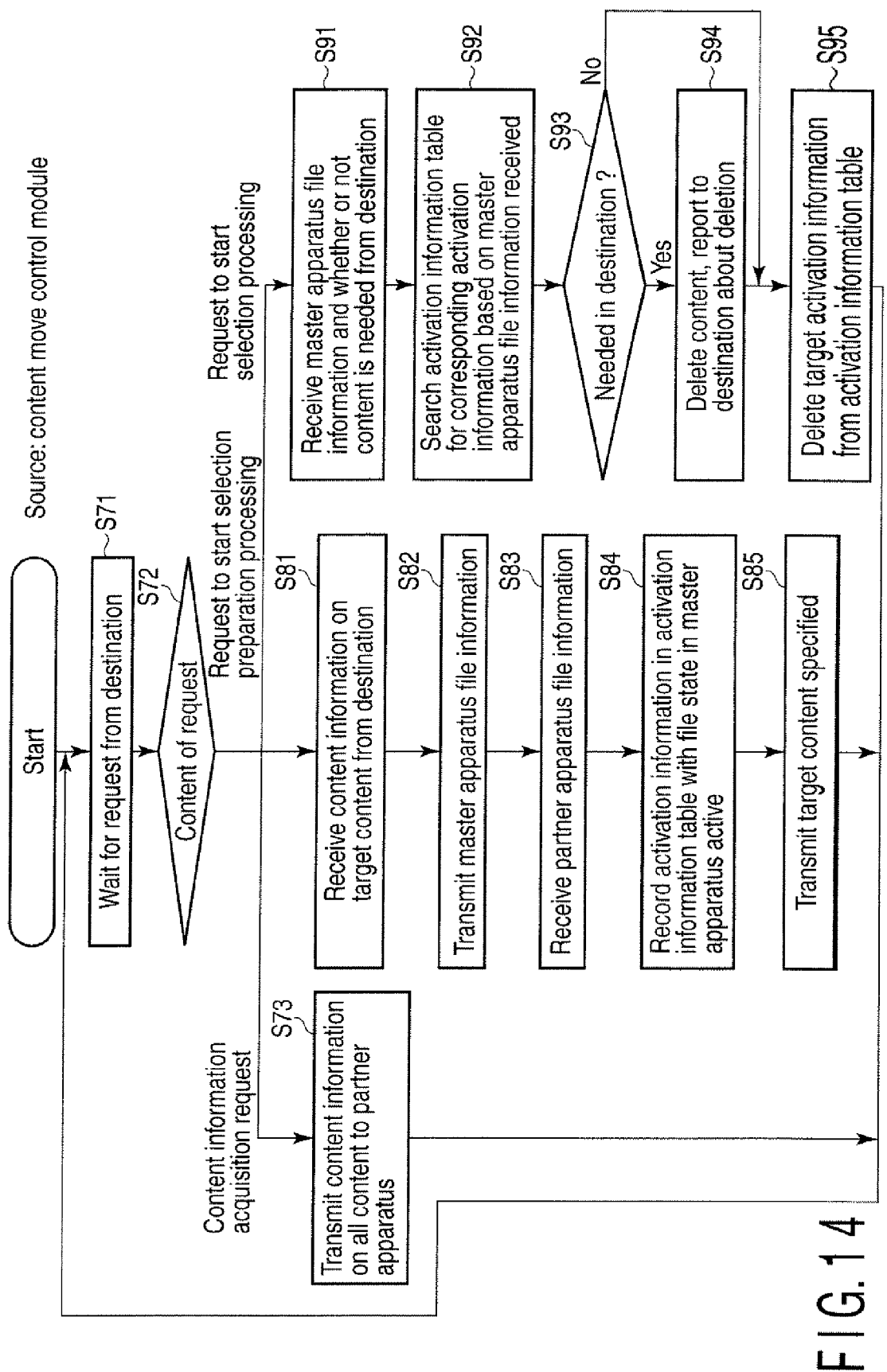
FIG. 14 is an exemplary flowchart showing the procedure of processing to be performed by a content move control processing module of the computer serving as the source apparatus.

Next, referring to FIG. 14, description will be given of the processing to be performed by the content move control module 301 of the computer 10 serving as the source apparatus. The content move control module 301 of the personal computer 10 starts processing upon system startup, and performs the following processing.

Initially, the content move control module 301 waits for a request from the multimedia player 20 serving as the destination apparatus (block S71). Receiving the request, the content move control module 301 determines the nature of the request (block S72). Depending on the nature of the request determined, the content move control module 301 performs one of the following processes.

If it is determined in block S72 that the request is a content information acquisition request, the content move control module 301 transmits the content information on all the content the own-apparatus has to the partner apparatus (block S73).

If it is determined in block S72 that the request is to start the selection preparation processing, the content move control module 301 receives the content information on the target content from the multimedia player 20 serving as the destination apparatus (block S81). Receiving the content information on the specified target content from the multimedia player 20, the content move control module 301 transmits the own-apparatus file information to the multimedia player 20 (block S82). The content move control module 301 receives the partner apparatus file information from the multimedia player 20 (block S83). The content move control module 301 records the information acquired so far in the activation information table as activation information, with the state of the file in the own-apparatus active (block S84). The content move control module 301 then transmits the specified target content to the multimedia player 20 serving as the destination apparatus (block S85).

If it is determined in block S72 that the request is to start the selection processing, the content move control module 301 receives the own-apparatus file information on the target content and a report of whether or not the content is needed in the destination, from the multimedia player 20 serving as destination apparatus (block S91). The content move control module 301 searches the activation information table for the corresponding item of activation information based on the own-apparatus file information received (block S92). The content move control module 301 determines whether or not the content is needed in the multimedia player 20 serving as the destination apparatus (block S93). If the content is determined to be needed (YES in block S93), the content move control module 301 deletes the active content in the own-apparatus, and reports the deletion to the multimedia player 20 (block S94). If it is determined in block S93 that the content is not needed in the multimedia player 20 (NO in block S93), or after the processing of block S94, the content move control module 301 deletes the target activation information from the activation information table of the own-apparatus (block S95). The content move control module 301 of the personal computer 10 repeats the foregoing processing.

To move content from the personal computer 10 to the multimedia player 20, a transaction-based move is performed halfway from the personal computer 10 to the multimedia player 20 in advance on the candidates of copyright-protected content to be moved. This merely finishes the transfer of the content so that the content is suspended at a point where it can be made usable immediately in the own-apparatus. The content can thus be used merely by carrying out the procedure of making the content usable at the time of use, allowing a quick move to the own-apparatus. This also makes it possible to select whether or not to move the content because the move can be easily cancelled from the suspended state.

Second Embodiment

In the first embodiment, active content is stored in the source at the point in time after the selection preparation. This provides the advantage that the content can be used in the source apparatus before making selection. Conversely, there is the disadvantage that the content cannot be used immediately in the destination.

If one who wishes to use some content in the multimedia player away from home goes out without having had time to perform the selection processing, he/she cannot use the content. Such a problem can be effectively addressed in the following way.

Candidate content is once moved to the destination completely. A transaction-based move is then performed halfway so as to move the content from the destination to the source so that the source has the inactive content and the destination has the active content. This is the selection preparation. Subsequently, at the time of user selection:

If the content is needed in the destination, delete the inactive content in the source; and If the content is not needed in the destination, delete the active content in the destination, and activate the inactive content in the source.

When the selection preparation is completed, the active content is stored in the destination. The foregoing problem can thus be avoided since the content is usable in the multimedia player, or the destination, without selection.

Third Embodiment

For example, the first embodiment and the second embodiment may be used in combination. That is, either of the methods may be used depending on each content item.

Which embodiment to perform the selection preparation processing with, the first embodiment or the second embodiment, may be determined during the period from the end of the selection preparation processing to the execution of the selection processing, depending on which apparatus the content is more likely to be used in.

Fourth Embodiment

The first embodiment has dealt with the case where the selection as to whether or not to use the content recorded in the personal computer 10 is made from the multimedia player 20.

The selection processing, however, may be performed in the personal computer 10. In this case, the following processing can be performed to move the content recorded in the personal computer 10 quickly even if the selection to be made is whether or not to reserve the content in the personal computer 10.

A transaction-based move is performed halfway so as to move candidate content from the personal computer 10 to the multimedia player 20 so that the personal computer 10 has the active content and the multimedia player 20 has the inactive content. This is the selection preparation. Subsequently, at the time of user selection:

If the content is needed in the personal computer 10, delete the inactive content in the multimedia player 20; and If the content is not needed in the personal computer 10, delete the active content in the personal computer 10, and activate the inactive content in the multimedia player 20.

Fifth Embodiment

The first embodiment and the fourth embodiment may be used in combination.

Selection preparation may be performed on both the content recorded in the personal computer 10 and the content recorded in the multimedia player 20, so that the content needed in the personal computer 10 can be moved to the personal computer 10 and the unneeded to the multimedia player 20 quickly at the time of selection.

A suitable concrete example is as follows. Suppose that content items A and B are recorded in the personal computer 10, and nothing in the multimedia player 20. Content item A is moved from the personal computer 10 to the multimedia player 20 for use in the daytime one day. In the daytime next day, content item A is moved to a DVD recorder because it is no longer in use in the multimedia player 20, and content item B is newly moved to the multimedia player 20 for use. In this case, the selection preparation processing according to the first and second embodiments may have been performed at night so that the content can be moved in a short time at the time of selection.

Sixth Embodiment

The transaction-based move by definition has no upper limit to the waiting time from the end of transfer of content to a report of deletion from the source. This implementation dependence can sometimes make activation impossible since the partner apparatus may quit waiting for activation at some point in time.

Content can be moved with reliability, however, by the apparatuses checking each other if they are capable of the methods of the embodiments and if neither will quit waiting at some point in the meantime, before starting the selection preparation processing.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video content recording apparatus comprising:
   a storage device configured to store copyright-protected video content in an active or inactive state;

a management module configured to manage information on video content that is transferred from a source apparatus and stored in the storage device, and the video content stored in the source apparatus;

a recording module configured to record the video content transferred from the source apparatus having the video content in the active state to the storage device in the inactive state;

an input module configured to be input that the video content is used after the transfer of the video content is completed; and to a control module configured to issue, to the source apparatus, a command for changing the state of the video content stored in the source apparatus to the inactive state based on the information on the video content managed by the management module when it is input that the video content is used, and to change the state of the video content stored in the storage device to the active state in response to changing of the state of the video content stored in the source apparatus to the inactive state.

2. The video content recording apparatus of claim 1, wherein
the control module deletes the video content from the storage device when it is input that the video content is not used, and deletes the information on the video content managed by the management module.

3. The video content recording apparatus of claim 1, further comprising:
an interrogation module configured to interrogate the source apparatus about information on video contents which are stored in the source apparatus; and
a determination module configured to determine a video content, which is matched with a move candidate determination condition set in advance, as a video content transferred from the source apparatus based on a result of the interrogation.

4. The video content recording apparatus of claim 3, wherein
the move candidate determination condition set in advance is a condition set in advance by a user.

5. A video content transfer method for transferring copyright-protected video content from a source apparatus to a destination apparatus, the method comprising:
managing, by the determination apparatus, information on the video content which is transferred from the source apparatus and video content stored in the destination apparatus;
transferring, by the source apparatus, the video content from the source apparatus and retaining video content in the active state in the source apparatus;
recording, by the source apparatus, the transferred video content in the inactive state in a storage device of the source apparatus;
detecting a inputting showing that the video content is used after the transferring of the video content is completed; and
changing the state of the video content stored in the source apparatus to the inactive state based on the managed information on the video content when it is detected that the video content is used, and then changing the state of the video content stored in the destination apparatus to the active state.

6. The video content transfer method of claim 5, wherein the source apparatus deletes the video content from the storage device when it is input that the video content is not used, and deletes the information on the video content.

7. The video content transfer method of claim 5, further comprising:
interrogating from the destination apparatus to the source apparatus about information on video contents stored in the source apparatus; and
determining, by the destination apparatus, a video content, matched with a move candidate determination condition set in advance, as a video content transferred from the source apparatus based on a result of the interrogation.

8. The video content transfer method of claim 7, wherein the move candidate determination condition set in advance is a condition set in advance by a user.

9. A video content recording apparatus comprising:
a storage device configured to store copyright-protected video content in an active or inactive state;
a management module configured to manage information on video content that is transferred from a source apparatus and stored in the storage device, and the video content stored in the source apparatus;
a recording module configured to record the video content in active state transferred from the source apparatus having the video content in the inactive state to the storage device;
an input module configured to be input that the video content is not used after the transfer of the video content is completed; and
a control module configured to delete the video content in active state stored in the storage device when it is input that the video content is not used, and to issue, to the source apparatus, a command for changing the state of the video content stored in the source apparatus to the active state.

10. A video content transfer method for transferring copyright-protected video content from a source apparatus to a destination apparatus, the method comprising:
managing, by the determination apparatus, information on the video content which is transferred from the source apparatus and video content stored in the destination apparatus;
transferring, by the source apparatus, the video content to the destination apparatus and retaining the video content in inactive state in the source apparatus;
recording, by the source apparatus, the transferred video content in an active state in a storage device of the source apparatus;
detecting a inputting showing that the video content is not used after the transferring of the video content is completed; and
deleting the video content stored in the storage device in the active state when it is detecting the inputting showing that the video content is not used, issuing a command for changing the state of the video content stored in the source apparatus to the active state.

* * * * *